United States Patent
Kugler et al.

(10) Patent No.: US 9,566,941 B2
(45) Date of Patent: Feb. 14, 2017

(54) ADJUSTING DEVICE FOR A FRONT LID

(71) Applicant: AUDI AG, Ingolstadt (DE)

(72) Inventors: Peter Kugler, Donauwörth (DE); Wolfgang Dorfner, Buxheim (DE); Harald Sternecker, Beilngries (DE); Bernhard Konrad Pfaller, Denkendorf (DE); Manfred Schindler, Markt Schwaben (DE)

(73) Assignee: AUDI AG, Ingolstadt (DE)

( * ) Notice: Subject to any disclaimer, the term of this patent is extended or adjusted under 35 U.S.C. 154(b) by 80 days.

(21) Appl. No.: 14/518,266

(22) Filed: Oct. 20, 2014

(65) Prior Publication Data

US 2015/0107929 A1  Apr. 23, 2015

(30) Foreign Application Priority Data

Oct. 21, 2013  (DE) .................... 10 2013 017 475

(51) Int. Cl.
*B60R 21/38* (2011.01)
*E05F 15/63* (2015.01)

(52) U.S. Cl.
CPC ............... *B60R 21/38* (2013.01); *E05F 15/63* (2015.01)

(58) Field of Classification Search
CPC .......... B60R 21/38; E05F 15/127; E05F 15/63
See application file for complete search history.

(56) References Cited

U.S. PATENT DOCUMENTS

| | | | |
|---|---|---|---|
| 6,415,882 B1 | 7/2002 | Schuster | |
| 6,533,058 B2* | 3/2003 | Peter | B60R 21/38 |
| | | | 180/274 |
| 6,860,356 B2 | 3/2005 | Peter | |
| 7,997,375 B2* | 8/2011 | Shaw | B60R 21/38 |
| | | | 180/274 |
| 8,635,757 B2 | 1/2014 | Bartsch et al. | |
| 2005/0082873 A1 | 4/2005 | Takehara | |
| 2015/0108770 A1* | 4/2015 | Kugler | B60R 21/38 |
| | | | 292/201 |

FOREIGN PATENT DOCUMENTS

| | | |
|---|---|---|
| CN | 1607130 | 4/2005 |
| DE | 19945755 | 3/2001 |
| DE | 20106478 | 4/2001 |
| DE | 10 2007 056277 A1 | 11/2001 |
| DE | EP1258402 | 11/2002 |
| DE | 10209664 | 10/2003 |

(Continued)

OTHER PUBLICATIONS

European Search Report with respect to counterpart European patent application EP 14 00 2923.

(Continued)

*Primary Examiner* — Paul N Dickson
*Assistant Examiner* — Joselynn Y Sliteris
(74) *Attorney, Agent, or Firm* — Henry M. Feiereisen LLC

(57) ABSTRACT

Adjusting device for a front lid with an actuator for raising the rear edge of the front lid, wherein the adjusting device has a front-lid-mounted leg with a guide and a vehicle-body-mounted retaining element with a section guided the guide, wherein the guide of the front-lid-mounted leg is movable relative to the section of the retaining element by the actuator for raising the rear edge of the front lid.

11 Claims, 4 Drawing Sheets

(56) References Cited

FOREIGN PATENT DOCUMENTS

| | | |
|---|---|---|
| DE | 10314180 | 9/2004 |
| DE | 102005057627 | 6/2007 |
| DE | 10 2006 042 498 | 3/2008 |
| DE | 10 2008 057880 A1 | 5/2010 |
| DE | 20 2013 101518 U1 | 4/2013 |
| KR | 20040003437 | 1/2004 |

OTHER PUBLICATIONS

Translation of European Search Report with respect to counterpart European patent application EP 14 00 2923.

* cited by examiner

ADJUSTING DEVICE FOR A FRONT LID

CROSS-REFERENCES TO RELATED APPLICATIONS

This application claims the priority of German Patent Application, Serial No. 10 2013 017 475.9, filed Oct. 21, 2013, pursuant to 35 U.S.C. 119(a)-(d), the content of which is incorporated herein by reference in its entirety as if fully set forth herein.

BACKGROUND OF THE INVENTION

The present invention relates to an adjusting device for a front lid with an actuator for raising the rear edge of the front lid.

It is known to provide a drive for front lids of motor vehicles to allow adjustment of the front lid in certain situations. For the protection of pedestrians, a front lid can be actively raised after detecting an impact, so that a portion of the impact energy can be absorbed through deformation of the front lid. Such active front lids are usually moved vertically upward and also horizontally rearward. However, unless the lid is raised, sufficient deformation space is in most cases not available due to the rigid support structure of the vehicle.

It would therefore be desirable and advantageous to obviate prior art shortcomings and to provide an improved adjusting device that offers enhanced adjustment possibilities.

SUMMARY OF THE INVENTION

According to one aspect of the present invention, an adjusting device for a front lid includes a front-lid-mounted leg having a guide, a vehicle-body-mounted retaining element, with a section of the vehicle-body-mounted retaining element being guided in the guide, and an actuator constructed to move the guide of the front-lid-mounted leg relative to the section of the vehicle-body-mounted retaining element for raising a rear edge of the front lid.

The adjusting device according to the invention has the body-mounted retaining element body that has a section guided in the guide. The body-mounted retaining element is fixedly connected to the body. A leg having a guide that cooperates with the section of the body-mounted retaining element is arranged on the front lid. The front-lid-mounted leg can be moved by the actuator together with the guide, whereby the rear edge of the front lid can be moved, in particular raised. The section guided in the guide guarantees a particularly good retention of the front lid.

According to an advantageous feature of the present invention, the reliability of the adjusting device according to the invention can be further improved, when the section of the vehicle-body-mounted retaining element is movable along the guide between two opposite stops. The two stops then form each a limit for the movement of the front lid relative to the body of the motor vehicle.

According to another advantageous feature of the present invention, the section of the vehicle-body-mounted retaining element guided in the guide may include a bolt which forms a rotational axis for pivoting the front lid. This bolt can thus form a pivot axis for the movement of the front lid, so as to not only improve the pedestrian protection by raiding the front lid, but also to pivot the front lid into a service position.

The pivoting movement is hereby initiated by operating the actuator, whereby the front lid is pivoted about the bolt forming the axis of rotation.

According to another advantageous feature of the present invention, the actuator may have a first vehicle-body-mounted rotary drive having a rotatable leg which is pivotally coupled to a first front-lid-mounted lever, and a second vehicle-body-mounted rotary drive having a rotatable leg which is connected to a second front-lid-mounted lever in an articulated manner. Provision of two rotary drives provides advanced adjustment possibilities when raising and moving the front lid. In particular, two rotary drives create a greater range of movement, which could not be realized with a single rotary drive.

In the adjusting device according to the invention, the two levers may advantageously be connected in an articulated fashion at a common attachment point of the front lid. Such configuration is advantageous in view of the required installation space.

According to another advantageous feature of the present invention, the adjusting device according to the invention may be arranged such that the front lid is substantially vertically movable, while the other rotary drive may be arranged such that the front lid is substantially horizontally movable. In other words, it is not necessary that the rotary drives cause a perfectly horizontal and/or vertical movement, i.e. the directions of movement are only approximately horizontal or vertical.

According to another advantageous feature of the present invention, the adjusting device according to the invention operates particularly reliable, when the adjusting device includes a control device, or is connectable or connected to a control device, which is configured to control the first and second rotary drive in a coordinated fashion. When the adjusting device according to the invention includes the two independently operable rotary drives, different movements of the front lid, which is movable relative to the vehicle body, can be realized through corresponding control of the rotary drive by the control device. For example, only the rear edge of the front lid may be raised. In addition, the front lid can also be moved horizontally by controlling the two rotary drives accordingly. In addition, the front lid can also be moved from a retracted, closed position to a service position, where the section of the vehicle-body-mounted retaining element guided in the guide, in particular the bolt, forms a pivot axis for pivoting the front lid to the service position. The adjusting device according to the invention preferably includes a control device which is configured to control the rotary drives so that the rear edge of the front lid can be moved to a raised and forward-shifted or rearward-shifted pedestrian protection position or to an even further raised and even further rearward-shifted type damage position, as well as to the aforementioned service position.

According to another advantageous feature of the present invention, for safety reasons, the adjusting device may have a locking mechanism associated with the front lid, allowing the front lid to be moved in the unlocked position. In this embodiment, the locking mechanism, which prevents the front lid from moving in the locked state, is first unlocked when the front lid is to be moved from the retracted position. The locking mechanism may be operated electrically so as to allow a quick release when a collision has been detected or is imminent.

The invention also relates to a motor vehicle. The motor vehicle according to the invention is characterized in that it has at least one adjusting device of the aforedescribed type. The motor vehicle according to the invention preferably includes two such adjusting devices which are disposed on opposite sides of the engine compartment of the motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
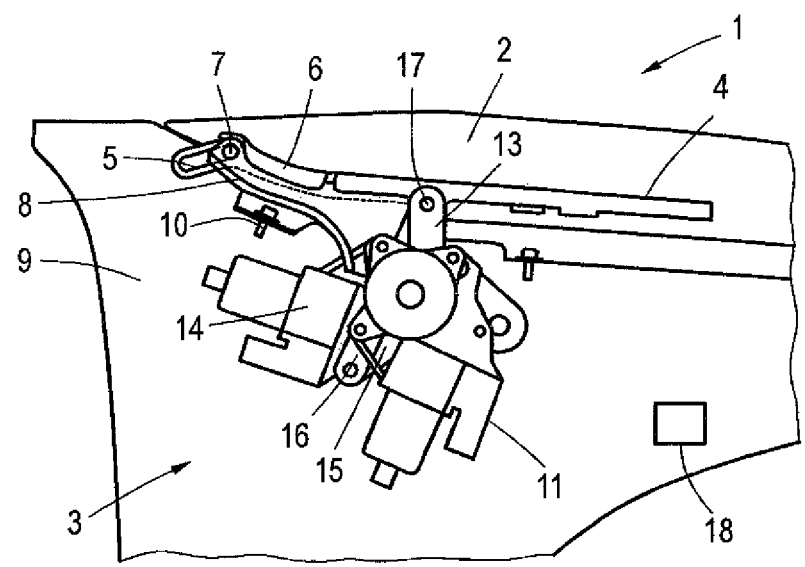
FIG. 1 is a side view of an adjusting device according to the present invention arranged in the engine compartment of a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view depicting the main components of an adjusting device 1 arranged in the engine compartment of a motor vehicle. Two such adjusting devices 1 are arranged in the engine compartment on opposite sides, with only one of the adjusting devices 1 visible in FIG. 1. FIG. 1 shows part of the engine compartment of a motor vehicle, wherein the rear of the vehicle is located to the left in the view shown in FIG. 1 and the front side of the vehicle to the right.

The adjusting device 1 is used to raise the front lid 2 and has for this purpose an actuator 3. The adjusting device 1 includes a front-lid-mounted leg 4, which is fixedly attached to the bottom of the front lid 2. As can be seen in FIG. 1, the leg 4 has at its rear end a guide 5 formed as an elongate recess. The rear end 6 of the front-lid-mounted leg 4 has a slightly upturned shape, followed by the guide 5 having the recess, with the guide 5 in turn extending obliquely downward and rearward. A bolt 7 of a vehicle-body-fixed retaining element 8 is guided in the guide 5. FIG. 1 shows that the vehicle-body-fixed retaining element 8 is connected to the vehicle body 9 by screws 10. The bolt 7, which is part of the vehicle-body-mounted retaining element 8 forms a pivot point or an axis of rotation for movement of the front lid 2. In the view shown in FIG. 1, the front lid 2 is in a retracted and closed position. In this position, the bolt 7 is in abutment with the right end (as illustrated in FIG. 1) of the guide recess 5 of the front-lid-mounted leg 4. Exact positioning of the front lid 2 is assured since the bolt 7 bears against one end of the guide 5 that forms a stop.

The actuator 3 of the adjusting device 1 includes a first vehicle-body-mounted rotary drive 11 having a rotatable leg 12 which, however, is hidden in the view of FIG. 1 by the rotary drive 11. The leg 12 is coupled to a first lever 13 affixed to the front lid 2. In addition, the actuator 3 includes a second vehicle-body-mounted rotary drive 14 with a rotatable leg 15, which is substantially obscured by the rotary drive 11 in FIG. 1. The rotatable leg 15 is coupled to a second lever 16 attached to the front lid 2. The two rotary drives 11, 14 thus have a mostly identical structure. A leg 12, 15 is mounted on each rotary drive in a rotation-locked manner which is rotated when the rotary drive 11, 14 is switched on; a respective lever 13, 16 is connected in an articulated fashion at the corresponding free end of the legs 12, 15, with the other end being attached in an articulated fashion to an attachment point 17 of front-lid-mounted leg 4. Both levers 13, 16 thus have a common attachment point 17. As can be seen in FIG. 1, the rotary actuator 11 is mounted so as to cause a substantially vertical movement of the front lid 2 when switched on, since the lever 13 is then substantially vertically movable. Conversely, the rotary drive 14 is arranged so as to perform a mainly horizontal movement when switched on, by which the front lid 2 can be moved horizontally.

Figure 2:
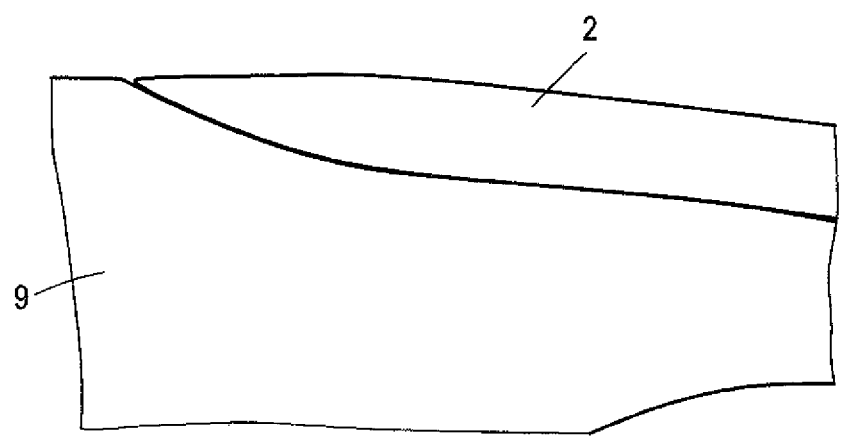
FIG. 2 shows a diagram of the same section of the motor vehicle as in FIG. 1, as viewed from the outside.

FIG. 2 shows in a side view from the outside the same detail of the motor vehicle as in FIG. 1 in the region of the rear end of the front lid 2.

The motor vehicle has environmental sensors for detecting a pedestrian who might collide with the vehicle. Additional sensors for detecting a currently occurring impact of a pedestrian are provided on the front of the vehicle. If a collision with a pedestrian can no longer be prevented by other maneuvers, for example, by a braking operation, the front lid 2 can be moved to a so-called pedestrian protection position. For this purpose, the front lid 2 is raised so that a free space is formed between the front lid 2 and the engine compartment, which is available as a deformation zone in the event of an impact of the pedestrian. Serious injury of the pedestrian can often be avoided or at least significantly reduced in this manner.

Figure 3:
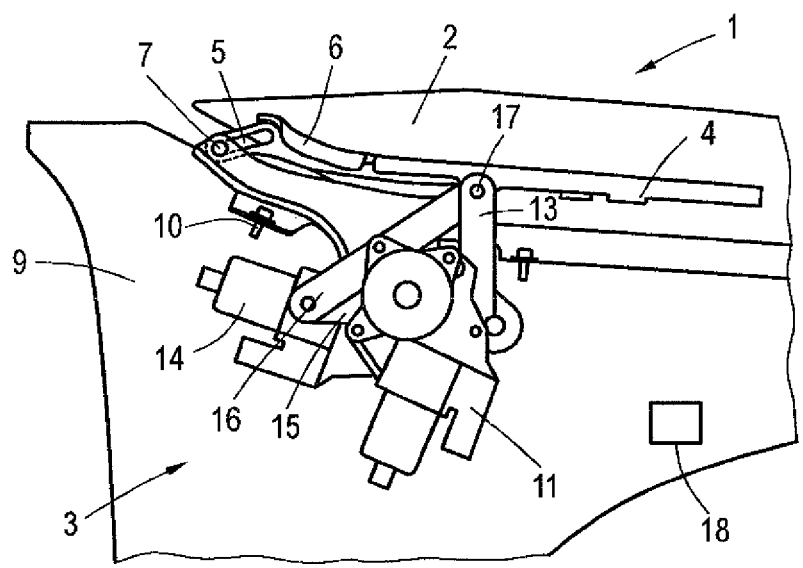
FIG. 3 is a similar side view of the adjusting device as in FIG. 1.

FIG. 3 is a side view similar to FIG. 1 and shows the adjusting device 1 after it has moved the front lid 2 to the pedestrian protection position. Starting from the position shown in FIG. 1, the actuator 3 is operated so that the two rotary drives 11, 14 rotate the respective legs 12, 15, thereby moving the levers 13, 16 coupled to the legs 12, 15. Since both levers 13, 16 are attached at their ends to the front-lid-mounted leg 4, the front lid 2 is shifted vertically and horizontally until the position shown in FIG. 3 is reached. It is evident from a comparison of FIGS. 1 and 3 that the front lid 2 was shifted from its initial position vertically upward and slightly forward. The vertical movement is effected substantially by the rotary drive 11, the horizontal displacement substantially by the other rotary drive 14. In order to prevent constraining forces, both rotary drives 11, 14 must be controlled in a coordinated fashion. To this end, the adjusting device 1 includes a control device 18, which is only schematically shown and which is connected to the rotary drives 11, 14 via unillustrated wire connections. The control device 18 optionally receives a signal from other safety systems installed in the motor vehicle to move the front lid 2 in the pedestrian protection position. In this case, the control device 18 controls the two rotary drives 11, 14 in a coordinated fashion, so that the front lid 2 is moved from the retracted position shown in FIG. 1 to the position that is shifted vertically upward and horizontally slightly forward. The two rotary drives 11, 14 can thereby be operated, i.e. switched on, successively or alternately or simultaneously. In this way, other positions of the front lid 2 in addition to the aforementioned pedestrian protection position can be approached.

Figure 4:
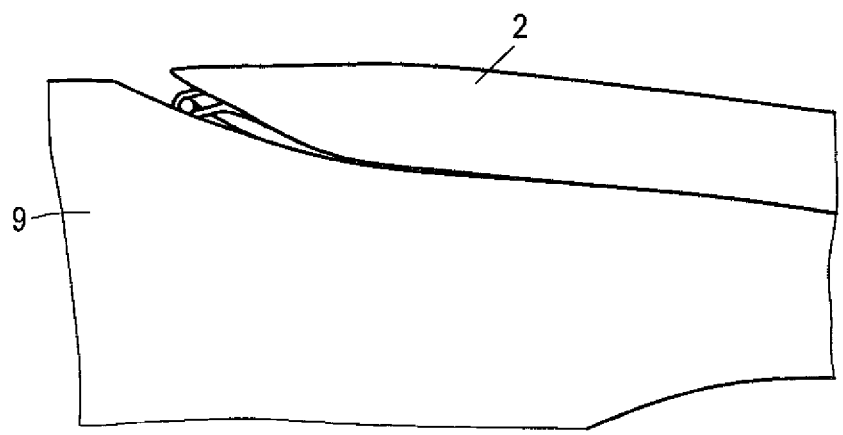
FIG. 4 is a similar side view of the front lid as in FIG. 2.

FIG. 4 is a view similar to FIG. 2, showing in a side view the front lid 2 moved to the pedestrian protection position.

Figure 5:
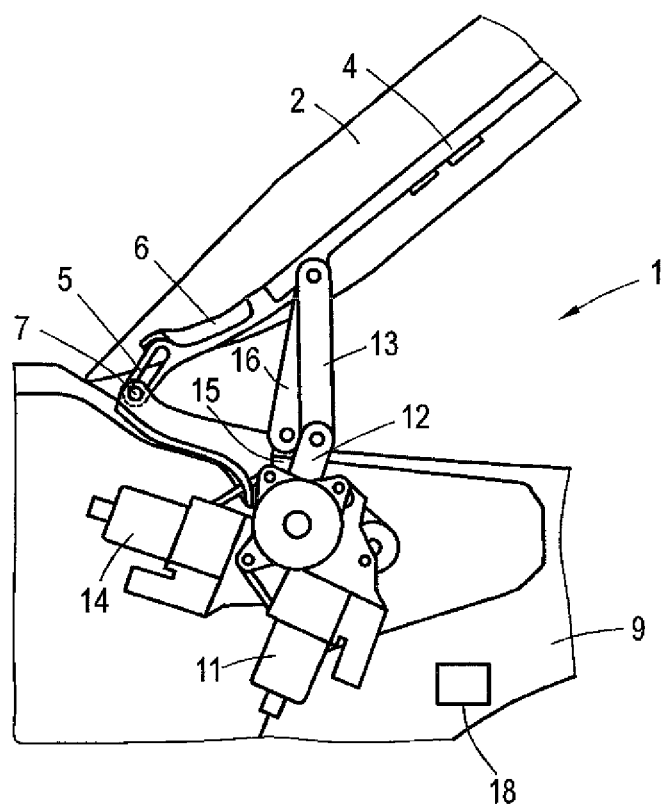
FIG. 5 shows the front lid moved by the adjusting device to a service position.

FIG. 5 is a side view showing the adjusting device 1, after the front lid 2 has been moved to a service position. The leg 12 mounted on the rotary drive 11 with a rotation lock is also visible in FIG. 5. Both legs 12, 15 and the levers 13, 16 are each pivoted to its highest vertical position, so that the front lid 2 is opened to a maximum. During the pivoting movement, the front lid 2 rotates about the bolt 7, which forms an axis of rotation.

Figure 6:
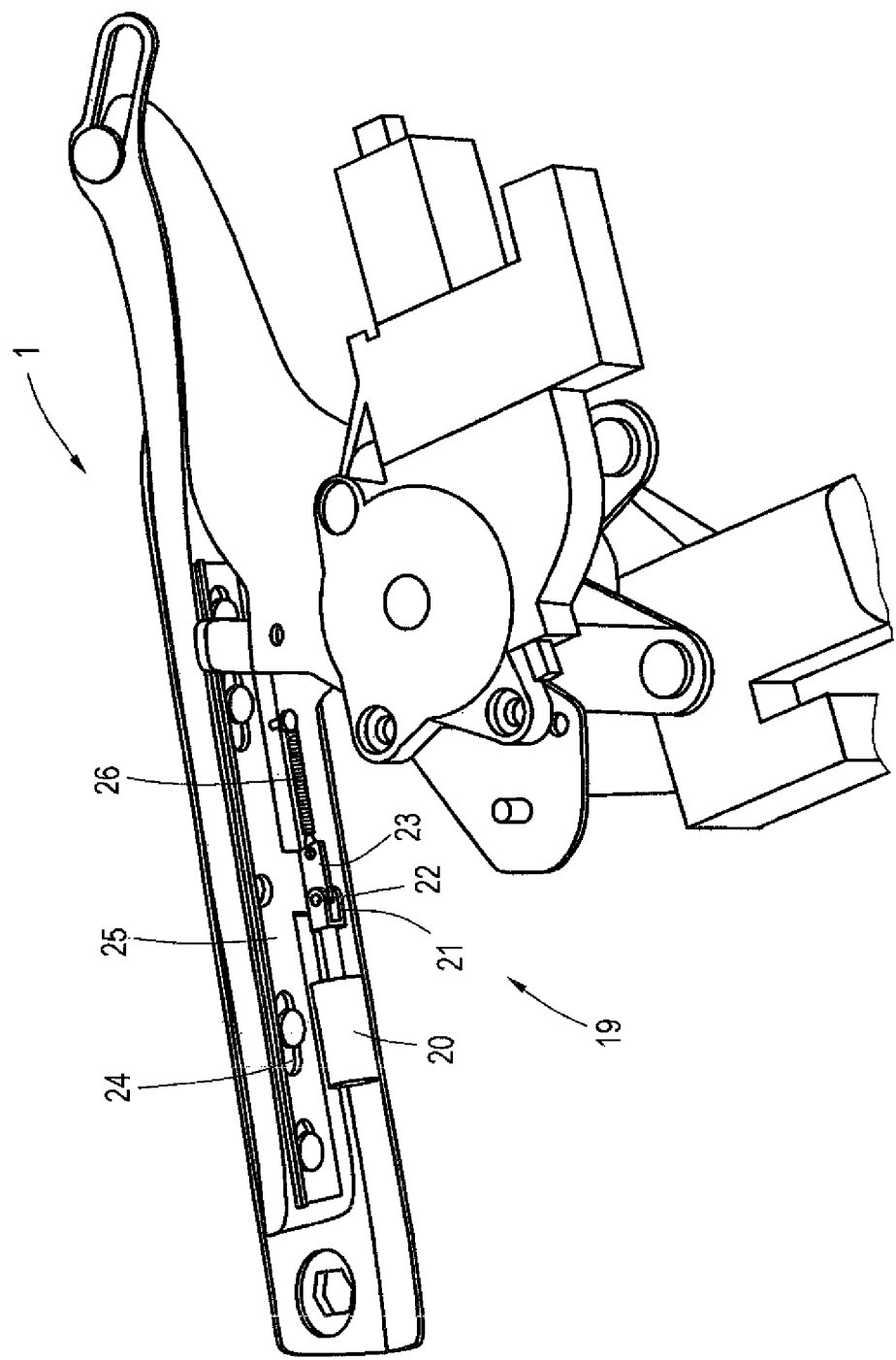
FIG. 6 is a perspective view of the adjusting device according to the invention.

FIG. 6 is a perspective view of the adjusting device 1. The adjusting device 1 includes a locking mechanism 19, whose design and function will be explained with reference to FIG. 6. The locking mechanism 19 includes a linearly movable slider 20, which is designed as a linear actuator and has a fork 21. The fork 21 is connected to an angled tab 23 by way of a pin 22. The tab 23 is part of a metal plate 25 having recesses 24. The metal plate 25 is linearly displaced by operating the slider 20, causing the front lid 2 to be unlocked which can then be raised. After the electrically driven slider 20 is turned off, the metal plate 25 is again moved back to its original position by the force of a helical spring 26.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An adjusting device for a front lid, comprising:
   a front-lid-mounted leg comprising a guide,
   a vehicle-body-mounted retaining element, with a section of the vehicle-body-mounted retaining element guided in the guide, and
   an actuator constructed to move the guide of the front-lid-mounted leg relative to the section of the vehicle-body-mounted retaining element for raising a rear edge of the front lid,
   wherein the actuator comprises a first vehicle-body-mounted rotary drive having a first rotatable leg that is connected in an articulated fashion to a first lever mounted on the front lid, and a second vehicle-body-mounted rotary drive having a second rotatable leg that is connected in an articulated fashion to a second lever mounted on the front lid.

2. The adjusting device of claim 1, wherein the section of the vehicle-body-mounted retaining element is movable along the guide between two opposite stops.

3. The adjusting device of claim 1, wherein the section of the vehicle-body-mounted retaining element guided in the guide comprises a bolt which forms a pivot axis for pivoting the front lid.

4. The adjusting device of claim 1, wherein the first and second levers are mounted in an articulated manner at a common attachment point on the front lid.

5. The adjusting device of claim 1, wherein the first rotary drive is arranged so as to move the front lid in a substantially vertical direction and the second rotary drive is arranged so as to move the front lid in a substantially horizontal direction.

6. The adjusting device of claim 1, further comprising a control device configured to control the first and second rotary drives in a coordinated fashion.

7. The adjusting device of claim 6, wherein the control device is configured to control the first and second rotary drives so as to move the rear edge of the front lid to a raised and horizontally shifted pedestrian protection position or to an even further raised and even further rearward-shifted type damage position.

8. The adjusting device of claim 1, wherein the adjusting device is connected to a control device configured to control the first and second rotary drives in a coordinated fashion.

9. The adjusting device of claim 1, further comprising a locking mechanism associated with the front lid, which allows movement of the front lid in an unlocked state.

10. A motor vehicle having at least one adjusting device for a front lid, the at least one adjusting device comprising:
    a front-lid-mounted leg comprising a guide,
    a vehicle-body-mounted retaining element, with a section of the vehicle-body-mounted retaining element guided in the guide, and
    an actuator constructed to move the guide of the front-lid-mounted leg relative to the section of the vehicle-body-mounted retaining element for raising a rear edge of the front lid,
    wherein the actuator comprises a first vehicle-body-mounted rotary drive having a first rotatable leg that is connected in an articulated fashion to a first lever mounted on the front lid, and a second vehicle-body-mounted rotary drive having a second rotatable leg that is connected in an articulated fashion to a second lever mounted on the front lid.

11. The motor vehicle of claim 10, comprising two adjusting devices disposed on opposite sides of an engine compartment of the motor vehicle.

\* \* \* \* \*